Dec. 26, 1950     A. C. OLAN     2,535,449

GAS SAVING DEVICE

Filed Sept. 20, 1948

INVENTOR
ALLAN CHARLES OLAN.
By
ATT'Y.

Patented Dec. 26, 1950

2,535,449

UNITED STATES PATENT OFFICE 2,535,449

GAS SAVING DEVICE

Allan Charles Olan, Niagara Falls, Ontario, Canada

Application September 20, 1948, Serial No. 50,142

1 Claim. (Cl. 123—119)

1

This invention relates to a device for utilizing the combustible gases which are normally wasted through the breather pipe of an internal combustion engine.

It is known that a percentage of the fuel which is drawn into the combustion chambers of an internal combustion engine through the intake manifold escapes, on the compression stroke, into the crank case before being burnt and is discharged to the atmosphere through the breather pipe of the crank case and consequently is wasted.

Various devices have heretofore been proposed for recovering this waste fuel and delivering it to the intake manifold. Many of such devices have not been satisfactory since they did not provide a means for automatically controlling the valve mechanism so that as the engine speed is increased or decreased, the valve will automatically open and close, to control the volume of waste fuel which is recirculated to the combustion chambers.

The object of the invention relates principally to a valve mechanism which will automatically open and close according to the engine speed to increase or decrease the volume of gaseous combustible gases being returned from the breather pipe to the combustion chamber through the intake manifold.

A further object of the invention is to provide a simple and inexpensive device for automatically controlling the amount of waste gases which are to be drawn from the breather pipe and delivered to the combustion chamber of an internal combustion engine.

Other and further objects will be apparent from the following description describing a preferred embodiment of my invention and illustrated in the accompanying drawings in which.

Like characters of reference refer to like parts throughout the specification and drawings.

Figure 1:
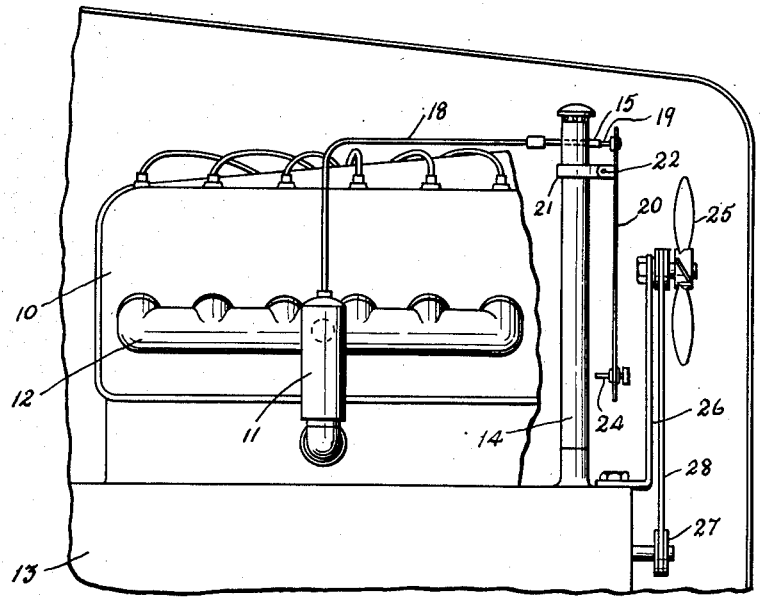
Figure 1 is a side elevation of an internal combustion engine which embodies this invention.
Figure 2:
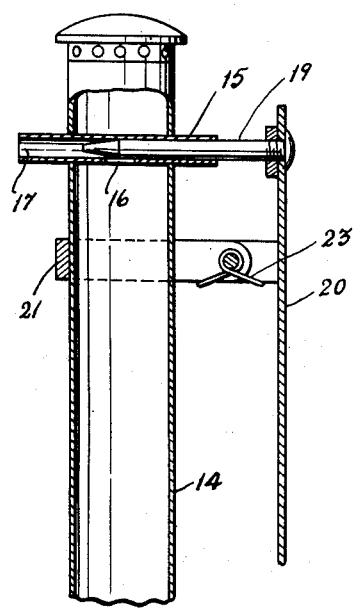
Figure 2 is an end elevation of the engine shown in Figure 1.
Figure 3:
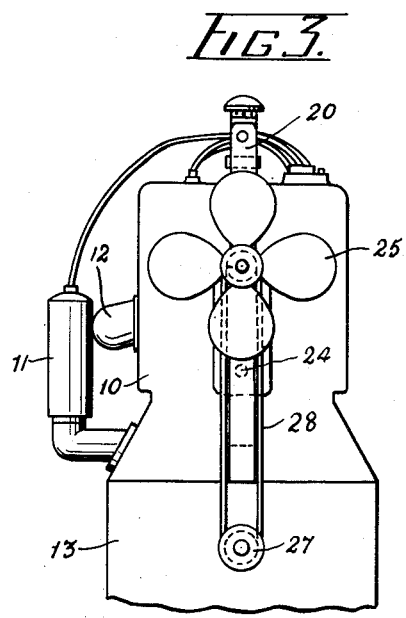
Figure 3 is a fragmentary view, partly in section, of the engine breather pipe illustrating the valve mechanism.

In Figure 1, I have shown only such parts of an internal combustion engine as are necessary to illustrate the construction and operation of my invention and these include the engine block 10 in which is housed the pistons, valves, combustion chamber etc., carburetor 11 which is connected to a suitable supply of combustible fuel such as gasoline, an intake manifold 12, crank

2 case 13 and a breather pipe 14 which communicates with the crank case through which unused combustible gases escape to the atmosphere and is also used as a conduit through which the oil supply in the crank case is replenished.

The valve mechanism which I have devised comprises a hollow body 15 which in the construction illustrated in the drawings takes the form of a tubular sleeve. The hollow body is mounted horizontally through the breather pipe with the ends projecting. The portion of the body 15 which lies within the breather pipe is provided with an inlet opening 16 and one of the projecting ends forms a discharge opening 17 which is connected to the manifold 12 by a conduit 18. Inserted through the other open end of the body 15 is a member 19 which is adapted to be reciprocated in the body 15 to open and close the inlet port 16 in response to changes in the speed of the engine.

The means for reciprocating the member 19 comprises a plate 20 pivotally supported on a bracket 21 which is attached in any suitable manner to the breather pipe 14. The pivot point, indicated by the reference numeral 22 is located slightly below the top end of the plate 20. The major portion of the plate 20 lies below the pivot 22 so that gravity, assisted by the spring 23 will effect the movement of the member 19 to a position which will normally close inlet port 16. The upper end of the plate 20 is connected to the projecting end of the member 19 and the lower end of the plate 20 is provided with an adjusting screw 24 to regulate the movement of the blade under the influence of the air pressure created by fan 25.

The fan 25 is supported on a bracket 26 which is attached to the crank case 13 and is driven by pulley 27 and belt 28. The pulley 27 is driven from some suitable part of the internal combustion engine.

The device operates in the following manner. As soon as the internal combustion engine is started in the usual manner, the fan 25 blows air against plate 20 causing it to move on its pivot to actuate the member 19 in a direction which will open the inlet port 16. As the engine's speed is increased or decreased, member 19 will be moved to open or close the inlet port 16 regulating the amount of fumes drawn from the breather pipe into the manifold.

What I claim as new and desire to protect by Letters Patent of the United States is:

In combination with the breather pipe of an internal combustion engine, a valve comprising a tubular body having an inlet port communicating with the breather pipe, a discharge port communicating with the intake manifold of said engine, a member reciprocably mounted in said body for opening and closing the inlet port, a plate adapted to be pivotally mounted on the breather pipe and having its upper end connected to said member, a blower adjacent said plate for directing an air current against said plate to move it and actuate said member, said blower being driven by the engine and a spring acting on said plate urging it towards a vertical position and resisting movement under the force of the air current.

ALLAN CHARLES OLAN.

REFERENCES CITED

The following references are of record in the file of this patent:

UNITED STATES PATENTS

| Number | Name | Date |
|---|---|---|
| 1,279,685 | Guthrie | Sept. 24, 1918 |
| 1,463,532 | Krichbaum | July 31, 1923 |
| 1,469,088 | Houser | Sept. 25, 1923 |
| 2,254,064 | Dressler | Aug. 26, 1941 |